(No Model.)

J. H. & T. D. MORRIS.
ANIMAL TRAP.

No. 287,387. Patented Oct. 23, 1883.

Attest:
D. Walter Fowler
C. B. Applewhaite

Inventors:
John H. Morris
Thos. D. Morris
per Attys.
A. H. Evans & Co.

UNITED STATES PATENT OFFICE.

JOHN H. MORRIS AND THOMAS D. MORRIS, OF SEWARD, NEBRASKA, ASSIGNORS TO THE F. F. ADAMS COMPANY, OF ERIE, PENNSYLVANIA.

ANIMAL-TRAP.

SPECIFICATION forming part of Letters Patent No. 287,387, dated October 23, 1883.

Application filed March 2, 1883. (No model.)

*To all whom it may concern:*

Be it known that we, JOHN H. MORRIS and THOMAS D. MORRIS, of Seward, in the county of Seward and State of Nebraska, have invented a new and useful Improvement in Animal-Traps, of which the following is a clear, full, and exact description, reference being had to the accompanying drawings, making a part of this specification, in which—

Figure 1:
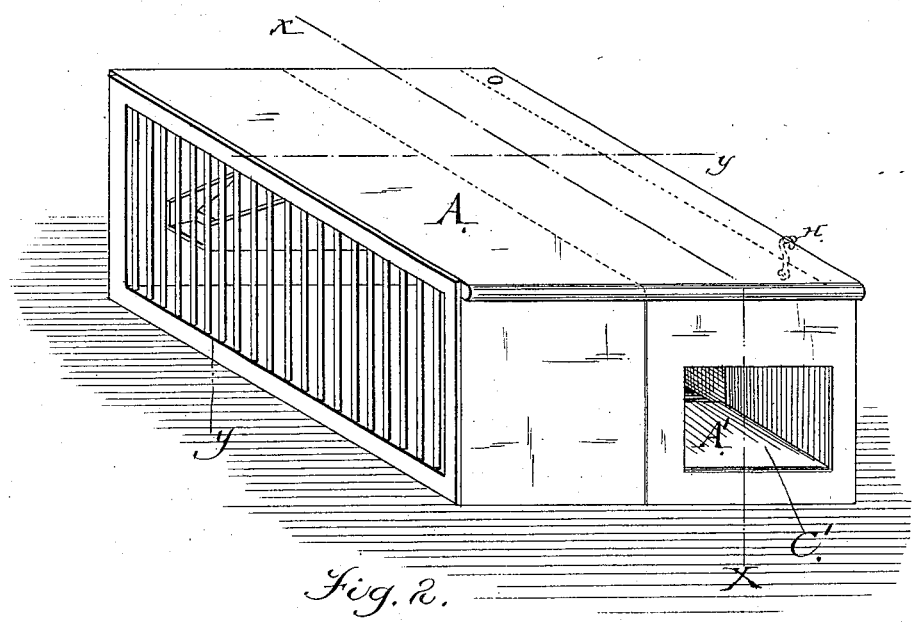
Figure 2:
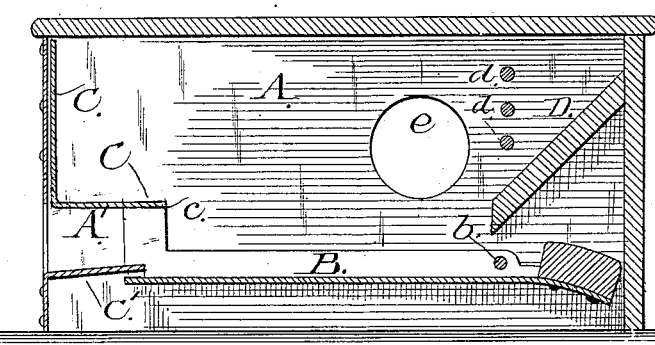
Figure 3:
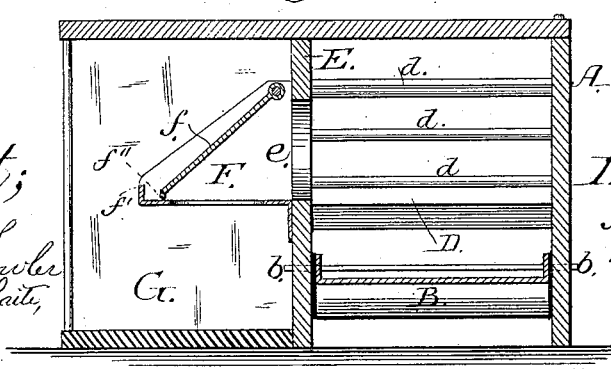

Figure 1 is a perspective view of our animal-trap with improvements attached. Fig. 2 is a longitudinal vertical section of the same through $x\,x$. Fig. 3 is a cross-section through $y\,y$.

The object of our invention is to furnish an improved automatic animal-trap, and has for its purpose to effect the continuous operation of the trap, and to cause the trap to reset itself after an animal has been caught; and our invention consists of certain details of construction, as hereinafter fully described, and specifically pointed out in the claims.

To enable others skilled in the art to make and use our invention, we will proceed to describe the exact manner in which we have carried it out.

In the drawings, A represents a box, within which is a narrow passage-way, A', provided with the tilting platform B, which is pivoted at $b$, and weighted in the rear end, so as to cause the platform to lie level in its normal condition, which keeps the entrance of the trap open, as shown in Fig. 1. The near end of the platform B is provided with two vertical side pieces, $c$, on which is secured the L-shaped gate C, the horizontal portion of the gate being nearly equal in width to the length of the animal to be trapped, and underneath which is the broad rigid step C', of equal width, which arrests the downward movement of the gate when the animal is entrapped. The step C' is also provided with a slight projection on its inner edge to hold the platform when in its normal position. The rigid step C' and horizontal portion of the L-shaped gate form the essential features of our invention, as by means of these agencies the animal is prevented from taking any alarm until too late to retreat. The operation of this part of our invention is as follows: The animal is wholly within the passage-way A' before he reaches the tilting platform B, and when he places his fore feet on the platform the first tilting motion brings the horizontal portion of the gate onto the back of the animal, until he passes entirely from under the horizontal portion of the gate, when the platform suddenly drops and the horizontal portion of the gate rests upon and just covers the step C', so that, if the animal springs back toward the entrance with a view to an escape he lands on the top of the horizontal portion of the gate and securely locks himself within the trap. In the rear end of the passage-way A' is an inclined shelf, D, to receive the bait, and in front of which are the bars $d$, so the bait will be exposed, and at the same time prevent the animal from securing it. The side E of the passage-way is provided with an opening, $e$, and on the opposite side of the partition is secured a small passage-way, F, which has the swinging cover $f$. The under side of this passage-way is slotted in the bottom to admit light in the passage-way, and to tempt the animal to escape through it, and keep him from attacking the swinging cover. When the animal finds himself entrapped, he attempts to escape by pushing up the swinging cover $f$ and following the passage-way to the chamber G. After passing the cover, which is pivoted loosely, the cover drops to its normal position, the small flange $f'''$ dropping in behind the transverse lip $f'$, and effectually preventing the cover $f$ being raised by the animal from the inner side. The animal is safely secured in the chamber G, from which he is removed by unfastening the hook H, which is secured to the outer side of the passage-way, passing over a pin or staple in the top, which covers the chamber G and the trap proper, A'.

Having thus described our invention, what we claim as new, and desire to secure by Letters Patent, is—

1. In a self-setting animal-trap, the tilting platform pivoted at $b$, and provided with the vertical side pieces, c, and the L-shaped gate C, in combination with the box A', provided with the rigid step C', all constructed to operate substantially as and for the purpose herein set forth.

2. The passage-way F, provided with a transverse lip, f', and having a slot in its bottom to admit light, in combination with the inclined swinging cover f, substantially as and for the purpose set forth.

JOHN H. MORRIS.
THOMAS D. MORRIS.

Witnesses:
 D. C. McKILLIP,
 L. G. JOHNS.